(12) United States Patent  (10) Patent No.: US 6,620,223 B2
Bloomer  (45) Date of Patent: Sep. 16, 2003

(54) PLEATED AIR FILTER ASSEMBLY

(75) Inventor: Stephen F. Bloomer, London (CA)

(73) Assignee: Siemens VDO Automotive Inc., Tilbury (CA)

( * ) Notice: Subject to any disclaimer, the term of this patent is extended or adjusted under 35 U.S.C. 154(b) by 0 days.

(21) Appl. No.: 09/845,858

(22) Filed: Apr. 30, 2001

(65) Prior Publication Data

US 2002/0046654 A1 Apr. 25, 2002

Related U.S. Application Data

(60) Provisional application No. 60/242,869, filed on Oct. 24, 2000.

(51) Int. Cl.[7] .......................... B01D 46/00; B01D 46/08
(52) U.S. Cl. .............................. 95/273; 55/490; 55/492; 55/498; 55/499; 55/500; 55/501; 55/502; 55/503; 55/504; 55/509; 55/521
(58) Field of Search .................... 55/490, 492, 495, 55/497, 498, 499, 500, 501, 502, 503, 504, 505, 507, 509, 521, 529, 379, DIG. 28; 95/273; 123/198 E

(56) References Cited

U.S. PATENT DOCUMENTS

| 3,468,626 | A | * | 9/1969 | Close | 423/278 |
| 4,138,234 | A | * | 2/1979 | Kubesa | 55/498 |
| 4,243,397 | A | * | 1/1981 | Tokar et al. | 55/492 |
| 4,257,790 | A | * | 3/1981 | Bergquist et al. | 55/507 |
| 4,498,915 | A | * | 2/1985 | Witchell | 55/498 |
| 4,563,789 | A | * | 1/1986 | Berfield | 15/323 |
| 4,878,930 | A | | 11/1989 | Manniso et al. | |
| 5,049,170 | A | * | 9/1991 | Parnoff | 55/498 |
| 5,106,397 | A | | 4/1992 | Jaroszczyk et al. | |
| 5,248,323 | A | * | 9/1993 | Stevenson | 55/498 |
| 5,307,538 | A | * | 5/1994 | Rench et al. | 55/472 |
| 5,591,338 | A | * | 1/1997 | Pruette et al. | 55/498 |
| 5,632,791 | A | * | 5/1997 | Oussoren et al. | 55/498 |
| 5,730,766 | A | | 3/1998 | Clements | |
| 5,865,863 | A | * | 2/1999 | DeSousa et al. | 55/497 |
| 6,096,207 | A | * | 8/2000 | Hoffman et al. | 55/498 |
| 6,167,862 | B1 | * | 1/2001 | Powell et al. | 123/198 E |
| 6,179,888 | B1 | * | 1/2001 | Mangiaforte | 55/379 |
| 6,299,661 | B1 | * | 10/2001 | Bloomer | 55/498 |

FOREIGN PATENT DOCUMENTS

EP  0896148  2/1999

OTHER PUBLICATIONS

European Search Report dated Oct. 25, 2001.

* cited by examiner

Primary Examiner—Duane Smith
Assistant Examiner—Jason M. Greene

(57) ABSTRACT

An air filter assembly which filters and purifies air prior to entering an external combustion engine includes a conical radially pleated filter element disposed over a filter carrier. When assembled, the pleats of the filter element are trapped between a plurality of internal teeth on an internal comb section of the filter carrier and a plurality of external teeth on an external comb section of an opening of the air cleaner box. The filter carrier further includes a plurality of struts which further shapes the filter element. A locking mechanism secures the air filter assembly to the air cleaner box.

17 Claims, 3 Drawing Sheets

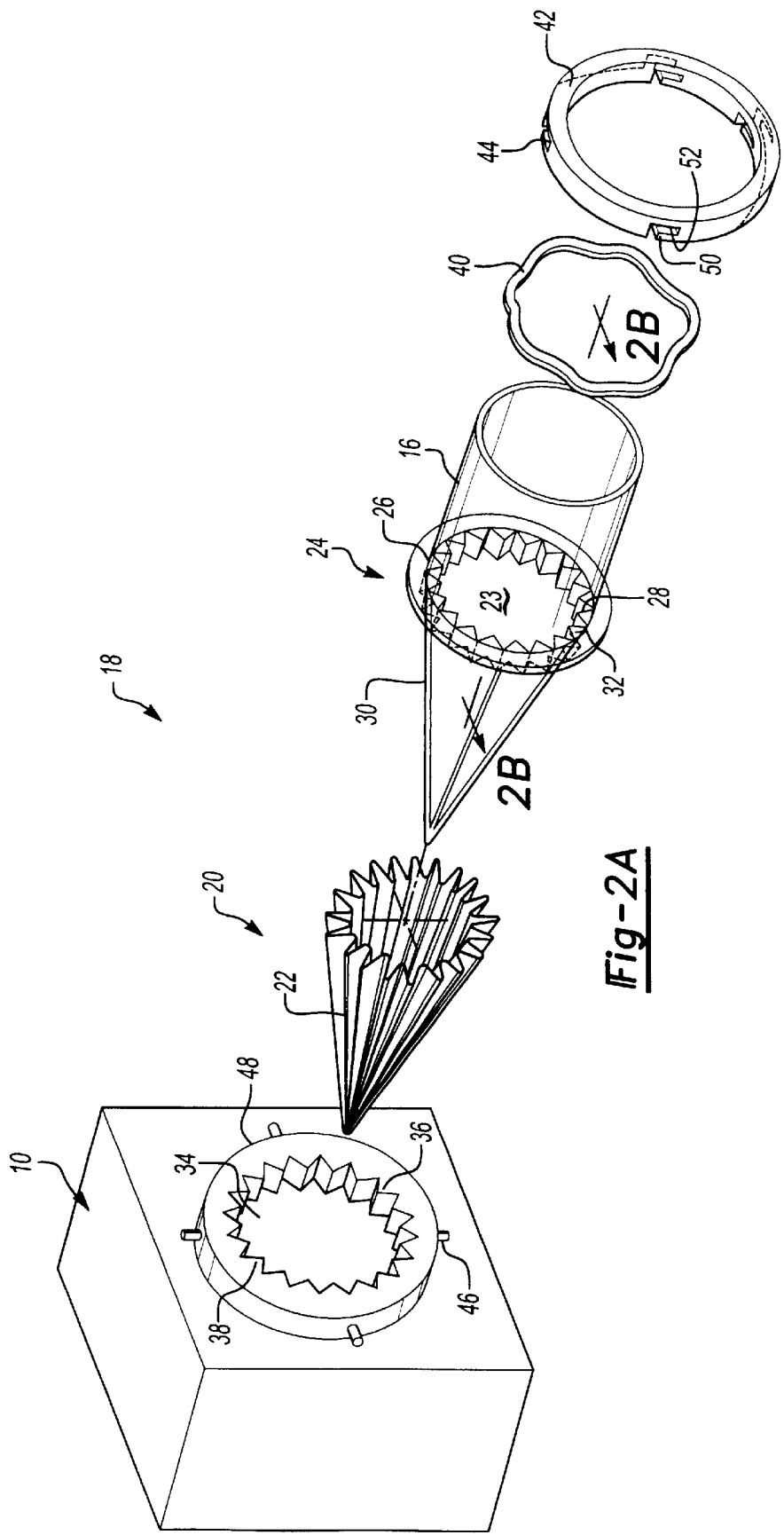

PLEATED AIR FILTER ASSEMBLY

This application claims priority from provisional application serial No. 60/242,869 filed Oct. 24, 2000.

BACKGROUND OF THE INVENTION

The present invention relates generally to an air filter assembly employed in an air cleaner assembly.

An air cleaner assembly purifies air entering from a customer specified underhood location. The air passes through an air cleaner box and flows through a filter which cleans the air. After being filtered, the air exits the air cleaner box through an outlet tube and enters an external combustion engine. In the external combustion engine, the filtered air is mixed with fuel for combustion.

In the prior art, a substantially flat or cylindrical filter cleans the air prior to exiting the air cleaner box through the outlet tube. The filter is commonly secured to the air cleaner box by an internal rubber seal. A drawback to this prior art filter assembly is the need for the rubber seal, which is expensive.

Hence, there is a need in the art for an improved air filter assembly employed in an air cleaner assembly.

SUMMARY OF THE INVENTION

The present invention relates generally to an air filter assembly employed in an air cleaner assembly.

The air filter assembly of the present invention includes a substantially conical radially pleaded filter element disposed over a filter carrier. The filter carrier supports the filter element and includes an annular surface including an internal comb section forming a plurality of internal teeth and a plurality of struts. The filter carrier and the filter element are inserted into an opening in an air cleaner box which includes an external comb section having a plurality of external teeth. When assembled, the pleats of the filter element are substantially trapped between the internal teeth of the internal comb section and the external teeth of the external comb section, creating an air-tight seal.

A locking ring secures the filter carrier to the air cleaner box. The locking ring is positioned over the annular surface of the filter carrier and twisted so that a plurality of posts on a ring surrounding the opening substantially engage a plurality of aligned slots on the locking ring, securing the locking ring to the air cleaner box. A spring wave washer is compressed between the annular surface and the locking ring, further pressing the filter carrier towards the ring surrounding the opening. An outlet tube is molded off of the annular surface and extends from the filter carrier towards the external combustion engine.

Accordingly, the present invention provides an air filter assembly employed in an air cleaner assembly.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 2A illustrates an exploded view of the air filter assembly of the present invention employed in an air cleaner assembly;

DETAILED DESCRIPTION OF THE PREFERRED EMBODIMENT

Figure 1:
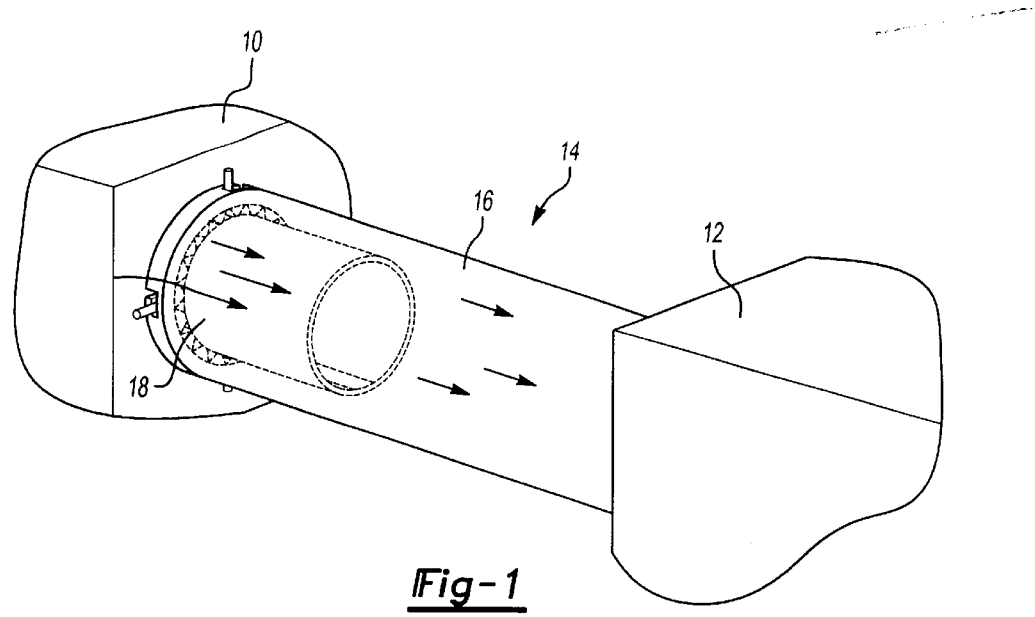
FIG. 1 illustrates an air cleaner assembly.

FIG. 1 illustrates an air cleaner box 10 of an air cleaner assembly 14 connected to an external combustion engine 12 by an outlet tube 16. A filter assembly 18 filters and purifies the air as it exits the air cleaner box 10. As known, air enters assembly 14 at one side, is filtered and passes to the engine 12.

The filter assembly 18 illustrated in FIG. 2A includes a filter element 20 and a filter carrier 24. It is preferred that the filter element 20 be substantially conical, although other shapes are possible. The filter element 20 is formed from a flat piece of filter media pleated radially to create a plurality of pleats 22. The filter media can be made of paper, a synthetic material, or other filter medias.

The pleated filter element 20 is disposed around an opening 23 in the filter carrier 24. The filter carrier 24 includes a planar annular surface 32 including a formed or molded internal comb section 26. The internal comb section 26 has teeth 28 facing radially outwardly and filter element 20 surrounds the internal comb section 26. The a plurality of internal teeth 28 are positioned, sized and shaped such that each of the plurality of internal teeth 28 substantially engage one of the plurality of pleats 22 of the filter element 20 when assembled.

The filter carrier 24 further preferably includes a plurality of integrally molded struts 30, each of which engage one of the plurality of pleats 22 to provide additional support to the filter element 20. Although four struts 30 are illustrated, it is to be understood that any number of struts 30 can be utilized. The outlet tube 16 leading to the external combustion engine 12 is integrally molded to a forward planar annular surface 32 of the filter carrier 24.

The filter carrier 24 with the over-disposed filter element 20 is inserted in the air cleaner box opening 34, which is formed with an external comb section 36 having a plurality of external teeth 38. The external teeth 38, the pleats 22 and the internal teeth 28 are positioned and numbered to substantially engage each other when assembled such that the pleats 22 of the filter element 20 are substantially trapped between external teeth 38 of the external comb section 36 of the opening 34 and the internal teeth 28 of the internal comb section 26 of the filter carrier 24.

Figure 2B:
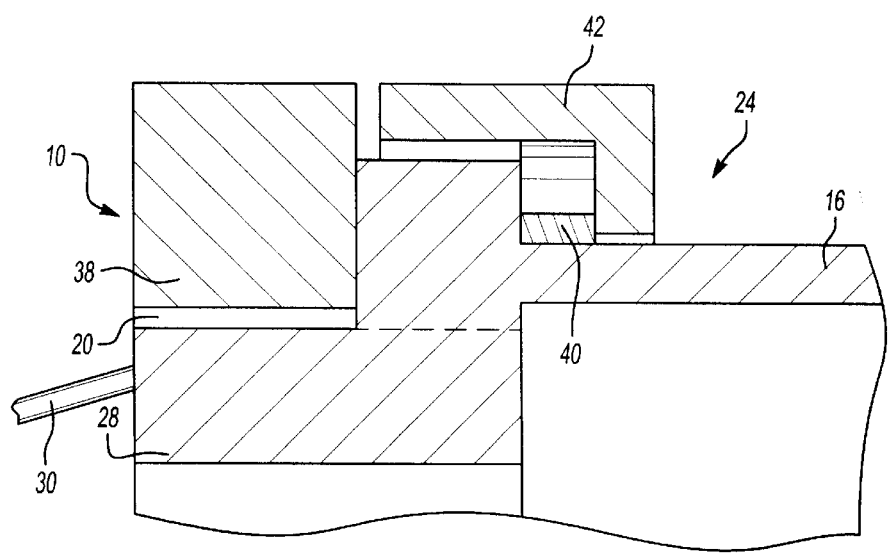
FIG. 2B illustrated the assembled components.

A spring wave washer 40 is compressed on the planar annular surface 32 of the filter carrier 24 by a locking ring 42, creating an air tight seal between the external comb section 36 and the internal comb section 26. The locking ring 42 is positioned over the washer 40 and "twist locked" to secure the locking ring 42 to the air cleaner box 12, the washer 40 pressing the planar annular surface 32 on a ring 48 surrounding the opening 34. The filter assembly 18 is shown in FIG. 2B.

In the preferred embodiment, the locking ring 42 includes a plurality of slots 44 positioned to align with a plurality of corresponding posts 46 on the ring 48 surrounding the box opening 34. The slots 44 include a first portion 50 and an angled second portion 52. It is preferred that the second portion 52 be substantially perpendicular to the first portion 50 of the slots 44.

The locking ring 42 is positioned over the ring 48 of the opening 34 so that each of the posts 46 substantially insert into one of the first portions 50 of the slots 44. The locking ring 42 is then rotated so that each of the posts 46 substantially engage one of the second portions 52 of the slots 44, securing the locking ring 42 to the box 12. The washer 40 is compressed between the locking ring 42 and the annular surface 32, further pressing the annular surface 32 of the filter carrier 24 on the ring 48 of the opening 34. Alternatively, the locking ring 42 can include the plurality of posts 46 and the ring 48 of the opening 34 can include the plurality of corresponding slots 44.

Although it is preferred that the filter element 20 be substantially conical, it is also possible that non-conical shapes can be employed. The filter element 20 is substantially shaped to correspond to the shape of the external and internal clamping combs 26, 36. In one embodiment, a substantially rectangular external clamping comb 36 and internal clamping comb 26 are utilized, the pleated filter element 30 being substantially shaped to correspond to the combs 26, 36.

Figure 3:
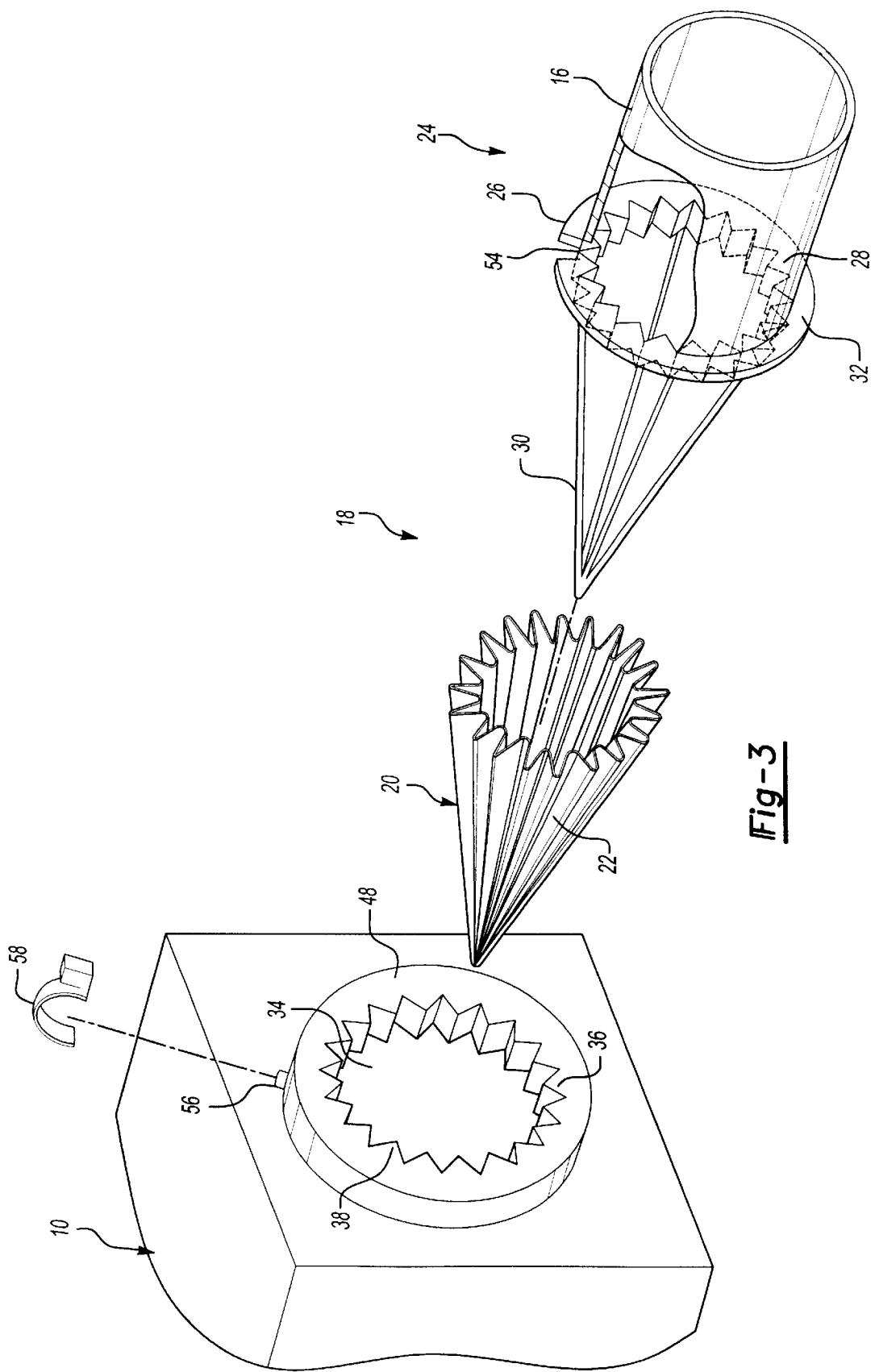
FIG. 3 illustrates an exploded view of an alternative embodiment of the air filter assembly of the present invention.

Alternatively, a spring clip 58 can be used to secure the filter carrier 24 to the box opening 34, as illustrated in FIG. 3. When assembled, a protrusion 56 in the ring 48 of the opening 34 substantially engages an indent 54 in the annular surface 32 of the filter carrier 24. A spring clip 58 is positioned over the engaged indent 54 and protrusion 56 to secure the filter carrier 24 to the ring 48 of the opening 34 of the air cleaner box 10. In this embodiment, the wave washer 40 and the locking ring 42 are not required.

Alternatively, a compressible annular surface 32 of a filter carrier 24 can be employed to secure the filter carrier 24 to the opening 34. In this embodiment, the filter carrier 24 is slightly compressed prior to insertion in the opening 34. After inserting the filter carrier 24, the compression is released, and the filter carrier 24 expands, securing within the opening 24.

There are several advantages to utilizing a conical filter element 20. For one, an expensive rubber seal is not needed, eliminating a component. As a result, the cost of forming the air cleaner assembly 18 is less expensive.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. An air cleaner assembly comprising:
   an air cleaner component having an opening;
   a conical filter element including a plurality of pleats;
   a filter carrier inserted within said filter element to substantially support said filter element in said opening, and said filter carrier further includes an annular surface having a plurality of internal teeth, each of said plurality of internal teeth substantially sized, shaped and positioned to correspond to one of said plurality of pleats of said filter element; and
   a locking mechanism to secure said filter element and said filter carrier to said air cleaner component when inserted within said opening of said air cleaner component.

2. An air cleaner assembly comprising:
   an air cleaner component having an opening;
   a conical filter element including a plurality of pleats;
   a filter carrier inserted within said filter clement to substantially support said filter element in said opening, and said filter carrier further includes a plurality of struts, each of said plurality of struts engaging one of said plurality of pleats of said filter element to provide support to said filter element; and
   a locking mechanism to secure said filter element and said filter carrier to said air cleaner component when inserted within said opening of said air cleaner component.

3. An air cleaner assembly comprising:
   an air cleaner component having an opening;
   a filter element including a plurality of pleats;
   a filter carrier inserted within said filter element to substantially support said filter element in said opening; and
   a locking mechanism to secure said filter element and said filter carrier to said air cleaner component when inserted within said opening of said air cleaner component wherein said opening of said cleaner component further includes a plurality of external teeth, each of said plurality of external teeth substantially sized, shaped and positioned to correspond to one of said plurality of pleats of said filter element.

4. An air cleaner assembly comprising:
   an air cleaner component having an opening;
   a filter element including a plurality of pleats;
   a filter carrier inserted within said filter element to substantially support said filter element in said opening; wherein each of said plurality of pleats of said filter element are substantially trapped between one of a plurality of internal teeth of said filter carrier and one of a plurality of external teeth of said opening of said air cleaner component; and
   a locking mechanism to secure said filter element and said filter carrier to said air cleaner component when inserted within said opening of said air cleaner component.

5. The air cleaner assembly as recited in claim 1 wherein said locking mechanism includes a locking ring positioned over said annular surface of said filter carrier.

6. The air cleaner assembly as recited in claim 5 wherein said locking mechanism includes at least one post on one of a ring surrounding said opening of said air cleaner component and said locking ring and at least one corresponding slot on the other of said ring surrounding said opening of said air cleaner component and said locking ring.

7. The air cleaner assembly as recited in claim 6 wherein said ring of said opening of said air cleaner component includes said at least one post arid said locking ring includes said at least one slot.

8. The air cleaner assembly as recited in claim 6 wherein said locking ring is rotated so that said at least one post substantially engages said at least one slot to secure said locking ring to said ring of said opening of said air cleaner component.

9. The air cleaner assembly as recited in claim 8 wherein a washer is positioned between said annular surface of said filter carrier and said locking ring.

10. The air cleaner assembly as recited in claim 1 wherein an outlet tube extends from said annular surface of said filter carrier.

11. An air cleaner assembly comprising:

a filter element including a plurality of pleats;

an air cleaner component including an opening having a plurality of external teeth, each of said plurality of external teeth substantially sized, shaped and positioned to engage one of said plurality of pleats of said filter element;

a filter carrier including an annular face having a plurality of internal teeth, each of said plurality of internal teeth substantially sized, shaped and positioned to engage one of said plurality of pleats of said filter element when said filter carrier is inserted within said filter element, each of said plurality of pleats being substantially trapped between one of said plurality of internal teeth of said filter carrier and one of said plurality of external teeth of said opening of said air cleaner component; and a locking mechanism to secure said lifter element and said filter carrier to said air cleaner component when inserted within said opening of said air cleaner component, said locking mechanism including a locking ring positioned over said annular surface of said filter carrier, at least one post on a ring surrounding one of said opening of said air cleaner component and said locking ring and at least one corresponding slot on the other of said ring surrounding said opening of said air cleaner component and said locking ring, said at least one post substantially engaging said at least one slot when said locking ring is rotated to secure said locking ring to said opening of said air cleaner component.

12. The air cleaner assembly as recited in claim 11 wherein said filter element is substantially conical shaped.

13. A method for forming an air cleaner assembly comprising the steps of:

inserting a filter carrier having a plurality of internal teeth into a filter element having a plurality of pleats such that each of said plurality of internal teeth substantially engage one of said plurality of pleats;

inserting said filter carrier and said filter element into an opening of an air cleaner component having a plurality of external teeth such that each of said plurality of pleats is substantially trapped between one of said plurality of internal teeth of said filter carrier and one of said plurality of external teeth of said opening of said air cleaner component; and locking said filter carrier and said filter clement to said air cleaner component by a locking mechanism.

14. The air cleaner assembly as recited in claim 2 wherein said filter element is made of paper.

15. The air cleaner assembly as recited in claim 2 wherein said filter element is made of a synthetic material.

16. The air cleaner assembly as recited in claim 6 wherein said slot is substantially L-shaped.

17. The air cleaner assembly as recited in claim 2 wherein a clip secures said filter carrier to said opening of said air cleaner.

* * * * *